May 1, 1945.  G. J. PIEROTTI  2,375,035
EXTRACTIVE DISTILLATION
Filed June 30, 1942
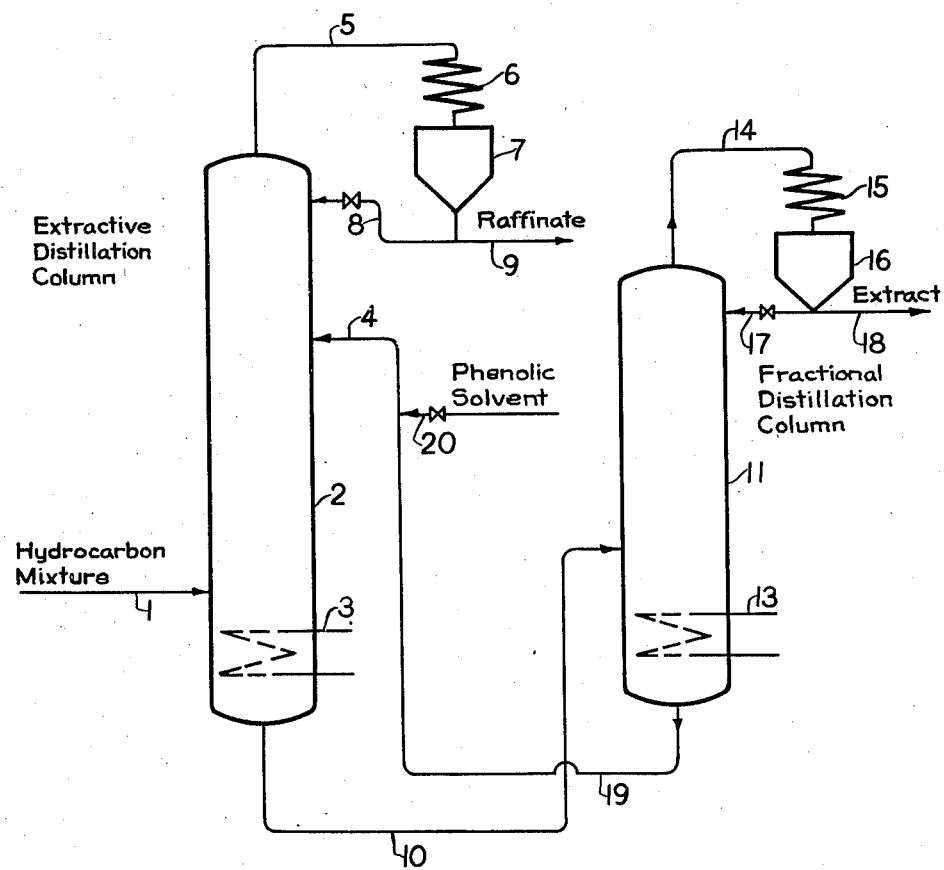
Inventor: Gino J. Pierrotti
By his Attorney:

Patented May 1, 1945

2,375,035

UNITED STATES PATENT OFFICE 2,375,035

EXTRACTIVE DISTILLATION

Gino J. Pierotti, Albany, Calif., assignor to Shell Development Company, San Francisco, Calif., a corporation of Delaware Application June 30, 1942, Serial No. 449,173

11 Claims. (Cl. 202—40)

The present invention relates to a distillation process. More particularly, it relates to a process wherein hydrocarbon mixtures containing diolefins are distilled in the presence of relatively high boiling selective solvents.

Heretofore many processes have been proposed for the separation of hydrocarbon mixtures by distillation in the presence of relatively high boiling selective solvents, which processes are generally termed "extractive distillation." In such processes the solvent is utilized to alter the normal vapor pressure relationships existing in such a manner that some of the hydrocarbons whose vapor pressures are relatively increased by the solvent are taken overhead, while those hydrocarbons whose vapor pressures are relatively reduced by the solvent are withdrawn as a bottom product dissolved in the solvent. In ordinary commercial installations these distillations are carried out continuously and the bottom product is distilled or otherwise treated in a separate step to separate solvent from the bottom hydrocarbon product. The separated sheet is then recycled to the distillation step to exert its vapor pressure-altering effect upon further quantities of hydrocarbon to be distilled. In processes of this type many different relatively high boiling selective solvents are employed, including among others phenol and/or alkyl phenols. These solvents are frequently employed for the separation of various hydrocarbon mixtures of different degrees of saturation; for example, they are especially suitable for the separation of relatively pure aromatic hydrocarbons such as benzene, toluene, the xylenes, etc., from petroleum distillates.

It has been found that such phenolic solvents are unsuited for the treatment of hydrocarbon fractions in the manner described above, whenever diolefin hydrocarbons are present in the material so treated. Apparently any diolefins present in the feed to such processes react under the conditions of distillation, with and in the presence of, such solvents to give high boiling products which result in solvent losses and also the introduction of the reaction products thus formed into the distillation system. Although the extent of these reactions is ordinarily slight, nonetheless the continual recirculation of the solvent to the system tends to build up harmful excesses of reaction products as well as cause unduly high solvent losses which prevent, in many cases, the operation of such distillation systems at maximum efficiency, requiring at the same time frequent shutdowns for cleaning and removal of reaction products, as well as solvent renewal.

In view of the otherwise eminently suitable properties of such phenolic solvents for the separation of hydrocarbon mixtures of different degrees of saturation, as well as their high selectivity and otherwise general stability for use in processes where solvent is recycled, it is desirable to find some manner of reducing this tendency for these solvents to react with diolefins in order that such solvents may be employed either when it is not desired to pretreat the mixture to remove or alter the character of the diolefins contained therein, or it is desired to supplement such treatment.

It is a object of my invention to provide a method for reducing the tendency of diolefins to react with phenolic solvents. Further objects will be apparent from the following.

My invention comprises adding to phenolic solvents which are recirculated to distillation processes for separation of hydrocarbon mixtures containing diolefins an alkali metal phenolate.

The accompanying drawing illustrates a flow of an extractive distillation process embodying this invention.

A narrow boiling hydrocarbon mixture to be extracted is introduced through line 1 into extractive distillation column 2 provided with a reboiler 3 at its bottom. The phenolic solvent containing alkali metal phenolate is introduced into column 2 through line 4 above line 1. Vapors of non-aromatic hydrocarbons in the mixture whose vapor pressures are relatively increased by the presence of the solvent are withdrawn from the top of column 2 through line 5 and are condensed in condenser 6. Condensate is collected in accumulator 7 and is withdrawn through line 9 as raffinate. Part of this raffinate may be returned as reflux to the top of column 2 through line 8.

Hydrocarbons dissolved in the solvent in column 2 are withdrawn through bottom line 10 and may be stripped from the solvent in the fractional distillation column 11 provided with a reboiler 13 at its bottom. Hydrocarbon vapors produced in column 11 are withdrawn through vapor line 14 and are condensed in condenser 15. Condensate is collected in accumulator 16 and is withdrawn through line 18 as the solvent-free extract. Part of this extract may be returned as reflux to column 11 through line 17. Solvent free from hydrocarbons is withdrawn from column 11 through bottom line 19 and is re-cycled through line 4 to column 2. Makeup phenolic solvent with or without phenolate may be introduced into the system through valved line 20 joining line 4.

For simplicity the drawing does not show auxiliary pumps, pipes, valves, tanks, etc., which may be necessary in carrying out the process, the proper placement of which will be evident at once to those skilled in the art.

I have found that the addition of alkali metal phenolates to result in phenolate concentrations of the order of 10% or less and preferably of the order of 5% or less materially reduces the tendency of diolefin hydrocarbons to react with phenolic solvents. For example, in a distillation setup for producing pure toluene wherein an untreated reformed gasoline fraction is distilled in the presence of phenol which dissolves the toluene and is withdrawn and separated from the toluene while the recovered phenol is continuously recirculated to the distillation to contact further quantities of cracked gasoline, it was found when operating with a cracked feed containing 2.9% diolefins that the rate of sludge formation was equivalent to 6.0% per day. After the addition of 0.5% potassium hydroxide to the phenol (equivalent to 1.48% potassium phenolate) the sludge formation dropped to a rate equivalent to only 1.0% per day. Thus the addition of the phenolate reduced the sludging tendency and phenol loss by a factor of 6.

As indicated in the example, in carrying out the present process it is not necessary that the alkali metal phenolate be added to the phenolic solvent as such. It is usually more convenient to merely add a hydroxide of the desired alkali metal to the phenol which results in the immediate formation of the corresponding phenolate.

While I have found that the addition of alkali metal phenolate consistently reduces the sludging tendency of phenolic solvents with diolefins by significant amounts, the degree of this reduction depends in some degree upon the diolefin concentration of the mixture being distilled. In general, it may be said that other things being equal the lower the initial concentration of the diolefins the more effective the phenolate.

Although the present invention has been described with particular reference to the solvents used in the separation of aromatic hydrocarbons from cracked gasoline fractions, it is obvious that it is also applicable to the separation of any hydrocarbon mixture containing diolefins wherein a solvent of the character described is employed.

Thus, my invention is applicable to the separation of hydrocarbon mixtures containing diolefins such as occur in cracked hydrocarbon or coal tar products, especially those hydrocarbon mixtures derived from vapor phase cracking processes; isomerization, reforming and hydroforming processes and the like; and particularly applicable to those processes or combinations of processes yielding aromatic hydrocarbons such as benzene, toluene, the xylenes and ethyl benzene, etc., in conjunction with diolefinic hydrocarbons boiling near the boiling temperature of the aromatic hydrocarbon it is desired to separate by distillation in the presence of the phenolic solvent in question.

Various solvents may be employed for the separation of aromatic hydrocarbons such as phenol, cresylic acids, xylenols, ethyl phenol, and alkyl phenol mixtures of indefinite composition preferably having on the average not more than 2 to 3 carbon atoms in the alkyl radicals. Suitable alkyl phenol mixtures which may be extracted from petroleum or coal tar distillates are preferably employed in the form of relatively narrow boiling mixtures.

Sometimes it is desirable to pretreat hydrocarbon mixtures containing excessively large quantities of diolefins to reduce their concentration prior to treatment by our process. Although the exact pre-reduction of diolefins required in any case will depend upon the exact operating conditions, etc., practical considerations usually demand that the diolefin concentration should not be greater than about 1%. Treatments capable of reducing the diolefin content are well known to the art. Examples are treatment with concentrated sulfuric acid, phosphoric acid vapor phase treatment, solutions of various salts such as, e. g., zinc chloride and other halides, sulfates, nitrites or other soluble salts of copper, cadmium, mercury, iron, zinc, etc., clay vapor phase treatment, treatment with anhydrous aluminum chloride, etc.

I claim as my invention:

1. A method for reducing the tendency for phenolic solvents to react with diolefins when a hydrocarbon mixture containing diolefins is distilled in the presence of such a solvent, comprising the step of distilling said mixture in the presence of said solvent containing a quantity of an alkali metal phenolate sufficient to materially reduce said tendency.

2. The process of claim 1 wherein said hydrocarbon mixture contains an aromatic hydrocarbon.

3. The process of claim 1 wherein said hydrocarbon mixture contains toluene and said solvent is phenol.

4. The process of claim 1 wherein said quantity of said phenolate corresponds to a concentration of phenolate not greater than 5%.

5. The process of claim 1 wherein said phenolate is formed by the addition of the corresponding alkali metal hydroxide.

6. The process of claim 1 wherein said hydrocarbon mixture is a cracked hydrocarbon fraction.

7. A process for separating a hydrocarbon mixture containing components of different degrees of saturation including diolefins comprising the steps of distilling said mixture in the presence of a phenolic solvent containing not more than 10% of an alkali metal phenolate under conditions to produce top and bottom products comprising said components, said bottom product containing said solvent and said phenolate, further distilling said bottom product to recover said solvent and said phenolate, and distilling further quantities of said mixture in the presence of said recovered solvent and phenolate.

8. The process of claim 7 wherein said distillation is carried out continuously and said recovered solvent and said phenolate are continuously recycled to said first mentioned distillation step.

9. The process of claim 7 wherein said hydrocarbon mixture is subjected to a preliminary treatment to reduce the diolefin content to a value not greater than about 1%.

10. In a process for separating a hydrocarbon mixture containing components of different degrees of saturation including diolefins, wherein said mixture is extractively distilled with a phenolic solvent to produce a raffinate and an extract containing said solvent, and wherein said solvent is separated from said extract and returned for distillation with more of said mixture, the improvement comprising maintaining a quantity of an alkali metal phenolate in said solvent during its circulation in the process not in excess of 10%.

11. A process for separating a hydrocarbon mixture containing components of different degrees of saturation including diolefins, comprising extractively distilling said mixture with a phenolic solvent containing a quantity of an alkali metal phenolate not in excess of 10% to produce a raffinate and an extract containing said solvent and phenolate, separating said solvent and phenolate from said extract, and returning said separated solvent and phenolate for distillation with more of said mixture.

GINO J. PIEROTTI.